United States Patent
Chung

(10) Patent No.: US 7,519,798 B2
(45) Date of Patent: Apr. 14, 2009

(54) UTILIZING A BRANCH PREDICTOR OUTCOME TO DECIDE WHETHER TO FETCH OR NOT TO FETCH FROM A BRANCH TARGET BUFFER

(75) Inventor: Sung-Woo Chung, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/921,135

(22) Filed: Aug. 19, 2004

(65) Prior Publication Data

US 2005/0091479 A1 Apr. 28, 2005

(30) Foreign Application Priority Data

Oct. 24, 2003 (KR) .................... 10-2003-0074689

(51) Int. Cl.
*G06F 9/30* (2006.01)
(52) U.S. Cl. ...................... 712/238; 712/239
(58) Field of Classification Search ............... 712/238
See application file for complete search history.

(56) References Cited

U.S. PATENT DOCUMENTS

| | | | | |
|---|---|---|---|---|
| 5,434,985 A | * | 7/1995 | Emma et al. ............... | 712/240 |
| 5,805,877 A | | 9/1998 | Black et al. | |
| 5,987,599 A | * | 11/1999 | Poplingher et al. .......... | 712/238 |
| 6,272,623 B1 | * | 8/2001 | Talcott ...................... | 712/239 |
| 6,418,525 B1 | | 7/2002 | Charney et al. | |

FOREIGN PATENT DOCUMENTS

| JP | 2002-189592 A | 7/2002 |
|---|---|---|
| KR | 00240591 B1 | 10/1999 |
| WO | WO 01/97021 A1 | 12/2001 |

OTHER PUBLICATIONS

"Branch Target Buffer, Return Address Stack", Author unknown, retreived from http://www.cs.ucsd.edu/~j2lau/cs141/week8.html, p. 1-3, dated Feb. 25, 2004.*

* cited by examiner

*Primary Examiner*—Richard Ellis
(74) *Attorney, Agent, or Firm*—Harness, Dickey & Pierce

(57) ABSTRACT

A method, system and branch predictor for branch prediction. The system includes a processor core for executing instructions, a branch target buffer for fetching a branch address, and a branch predictor for first predicting a branch of a current instruction address and indicating to the processor core when to fetch the branch address from the branch target buffer. A branch predictor, including a branch prediction table for storing a plurality of branch prediction values of previous branch instructions, and a controller for selecting one of the plurality of branch prediction values and outputting the selected one of the plurality of branch prediction values to a processor core, the selected one of the plurality of branch prediction values indicating to the processor core when to fetch a branch address from a branch target buffer. A method of branch prediction, including first outputting a current instruction address from a processor core to a branch predictor, predicting whether a branch occurs based on the received current instruction address and a global history, and second outputting a branch prediction value from the branch predictor to the processor core, the branch prediction value indicating whether the processor core fetches a branch address from a branch target buffer.

44 Claims, 5 Drawing Sheets

UTILIZING A BRANCH PREDICTOR OUTCOME TO DECIDE WHETHER TO FETCH OR NOT TO FETCH FROM A BRANCH TARGET BUFFER

CROSS-REFERENCE TO RELATED APPLICATIONS

This U.S. nonprovisional patent application claims priority under 35 U.S.C. § 119 of Korean Patent Application 2003-74689 filed on Oct. 24, 2003, the entire contents of which are hereby incorporated by reference.

BACKGROUND OF THE INVENTION

1. Field of the Invention

The present invention relates generally to a branch predictor, system and method of branch prediction, and more particularly, to a branch predictor, system and method of branch prediction with a reduced power consumption in pipelined microprocessors.

2. Description of the Related Art

By the conventional art, microprocessors may include a pipeline architecture. The performance of pipelined microprocessors may relate to their use of branch prediction. Pipelined microprocessors may execute instructions sequentially or may skip certain sequential instructions in order to execute instructions in a non-sequential order. A non-sequential execution of instructions may be referred to as a branch, and the instruction indicating to the pipelined microprocessors to execute a branch may be referred to as a branch instruction. In pipelined microprocessors, a branch may be a factor in determining the overall performance of a microprocessor because the microprocessor may stall its execution until a determination is made on whether or not to execute the branch.

A branch predictor may be used to predict the next instruction address to be executed by the pipelined microprocessors. The predicted next instruction address may be fetched from a branch target buffer in order to avoid a pipeline stall. However, an error in the branch prediction may result in a pipeline stall, as the correct next instruction address may need to be read into the branch target buffer. Thus, branch prediction may affect the overall performance of the microprocessor.

Various branch predictors have been suggested by the conventional art. For example, a GSHARE branch predictor may predict a branch by using a branch prediction table indexed by an address of the current instruction being executed and a history of previous branch results. Hereinafter, the history of previous branch results may be referred to as a global history.

FIG. 1 illustrates a block diagram of a branch prediction system using the conventional GSHARE branch predictor. Referring to FIG. 1, the conventional branch prediction system may include a processor core 102, a branch predictor 104 and a branch target buffer 106. The processor core 102 may output an address ADDR of the current instruction to the branch predictor 104, and fetch the address of the next branch from the branch target buffer 106. The branch predictor 104 may perform branch prediction for the current instruction address and may transfer a final branch prediction value PRED_V to the processor core 102.

FIG. 2 illustrates a block diagram of the conventional GSHARE branch predictor of FIG. 1 in more detail. Referring to FIG. 2, the conventional GSHARE branch predictor may index an entry 204-$k$ of a branch prediction table 204 using an index value IND_V generated by an XOR operation 206 performed on an output of a global history 202 and a current instruction address 200. A least significant bit (LSB) of the value stored in the indexed entry 204-$k$ (i.e. a result of a previous branch for an instruction) may be selected as the final branch prediction value PRED_V of the current instruction address 200. Thus, branch prediction may be performed irrespective of whether or not a branch of the current instruction address is taken. If such a branch prediction is completed, the final branch prediction value PRED_V may be used to update the global history 202 and the entry 204-$k$ of the branch prediction table 204 in order to predict a next branch in a next iteration of the branch prediction.

Referring again to FIG. 1, because the branch prediction for the current instruction address and the fetching of the branch address from the branch target buffer 106 may be performed in a single clock cycle, the processor core 102 may access both the branch prediction table 204 of FIG. 2 and the branch target buffer 106 of FIG. 1 prior to determining whether to execute a branch based on the current instruction address. However, if the branch prediction result PRED_V indicates a branch will not be taken, it may not be necessary to fetch a branch address from the branch target buffer 106. Fetching an unnecessary branch address from the branch target buffer 106 may increase the power consumption of the pipelined microprocessors.

SUMMARY OF THE INVENTION

An exemplary embodiment of the present invention is a system of branch prediction, including a processor core for executing instructions, a branch target buffer for fetching a branch address, and a branch predictor for first predicting a branch of a current instruction address and indicating to the processor core when to fetch the branch address from the branch target buffer.

Another exemplary embodiment of the present invention is a branch predictor, including a branch prediction table for storing a plurality of branch prediction values of previous branch instructions, and a controller for selecting one of the plurality of branch prediction values and outputting the selected one of the plurality of branch prediction values to a processor core, the selected one of the plurality of branch prediction values indicating to the processor core when to fetch a branch address from a branch target buffer.

Another exemplary embodiment of the present invention is a method of branch prediction, including first outputting a current instruction address from a processor core to a branch predictor, predicting whether a branch occurs based on the received current instruction address and a global history, and second outputting a branch prediction value from the branch predictor to the processor core, the branch prediction value indicating whether the processor core fetches a branch address from a branch target buffer.

BRIEF DESCRIPTION OF THE DRAWINGS

The present invention will become more apparent by describing in detail exemplary embodiments thereof with reference to the attached drawings in which.

DETAILED DESCRIPTION OF THE INVENTION

Figure 1:
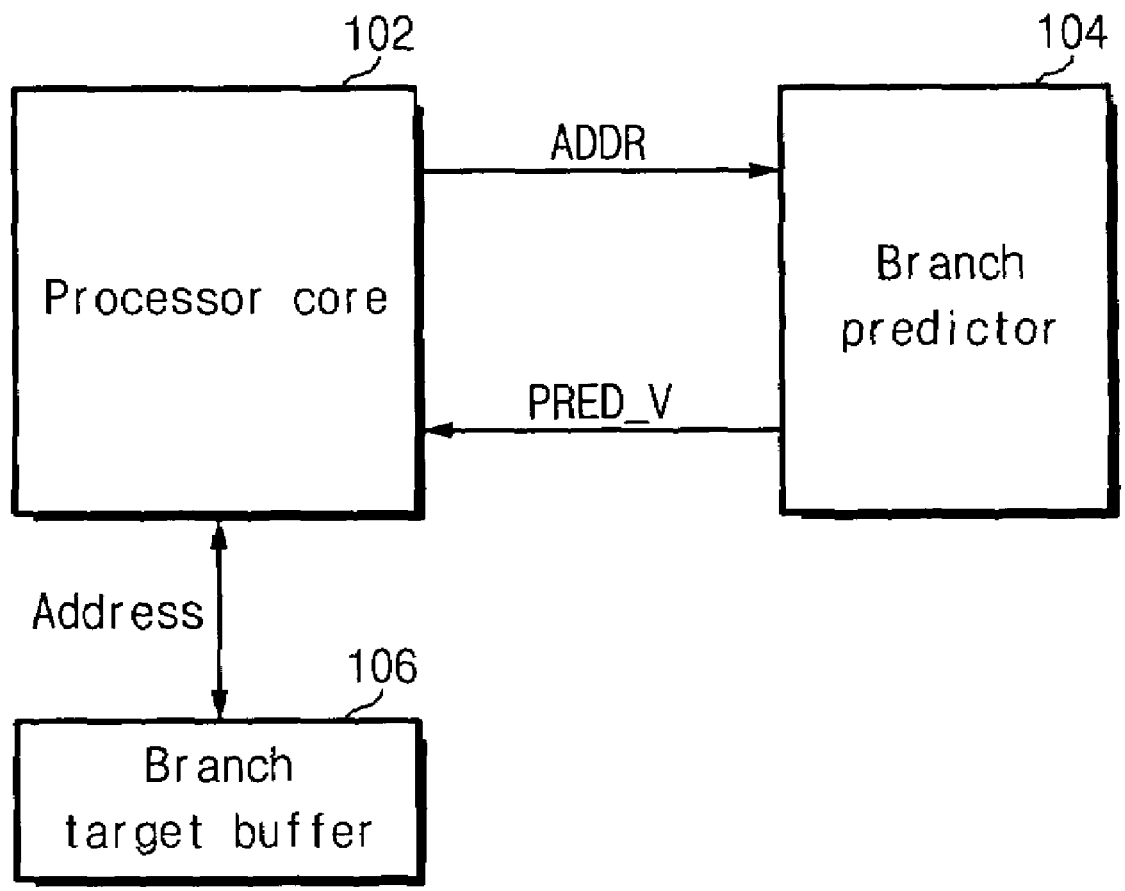
FIG. 1 illustrates a block diagram of a branch prediction system using the GSHARE branch predictor by conventional methods.
Figure 2:
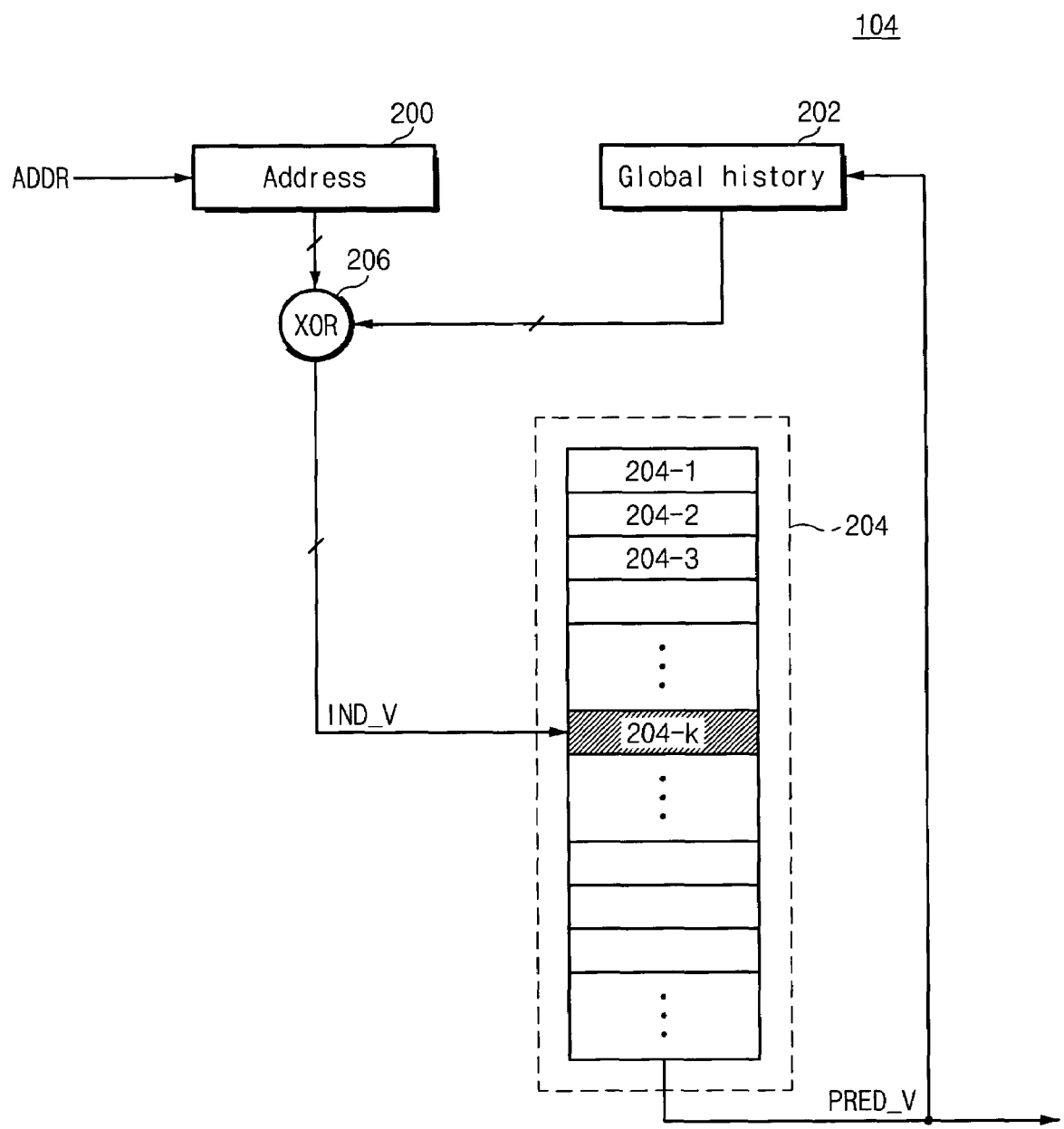
FIG. 2 illustrates a block diagram of the GSHARE branch predictor of FIG. 1 by conventional methods.

Hereinafter, exemplary embodiments of the present invention will be described in detail with reference to the accompanying drawings.

In the Figures, the same reference numerals are used to denote the same elements throughout the drawings.

Figure 3:
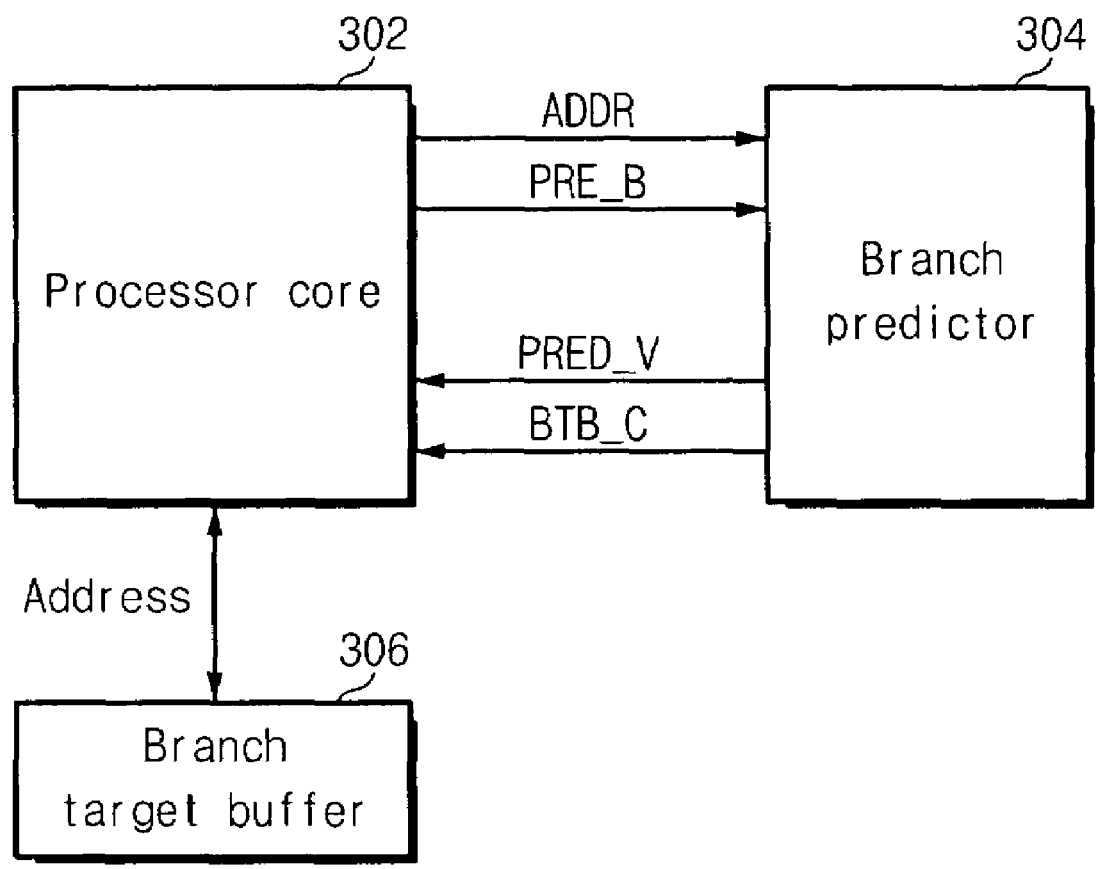
FIG. 3 illustrates a block diagram of a branch prediction system according to an exemplary embodiment of the present invention.

FIG. 3 illustrates a block diagram of a branch prediction system according to an exemplary embodiment of the present invention. As shown in FIG. 3, the branch prediction system may include a processor core 302, a branch predictor 304 and a branch target buffer 306. The processor core 302 may output branch information PRE_B to the branch predictor 304. The branch information PRE_B may represent an address ADDR of a current instruction and/or may indicate whether a previous instruction is a branch instruction. The branch predictor 304 may predict a branch of the current instruction using the address of the current instruction, and may output a final branch prediction result PRED_V to the processor core 302. The branch predictor 304 may indicate to the processor core 302 when to fetch a branch address from the branch target buffer 306 with the final branch prediction value PRED_V. The indication of when to fetch a branch address from the branch target buffer 306 may be based at least in part on the branch information PRE_B.

Figure 4:
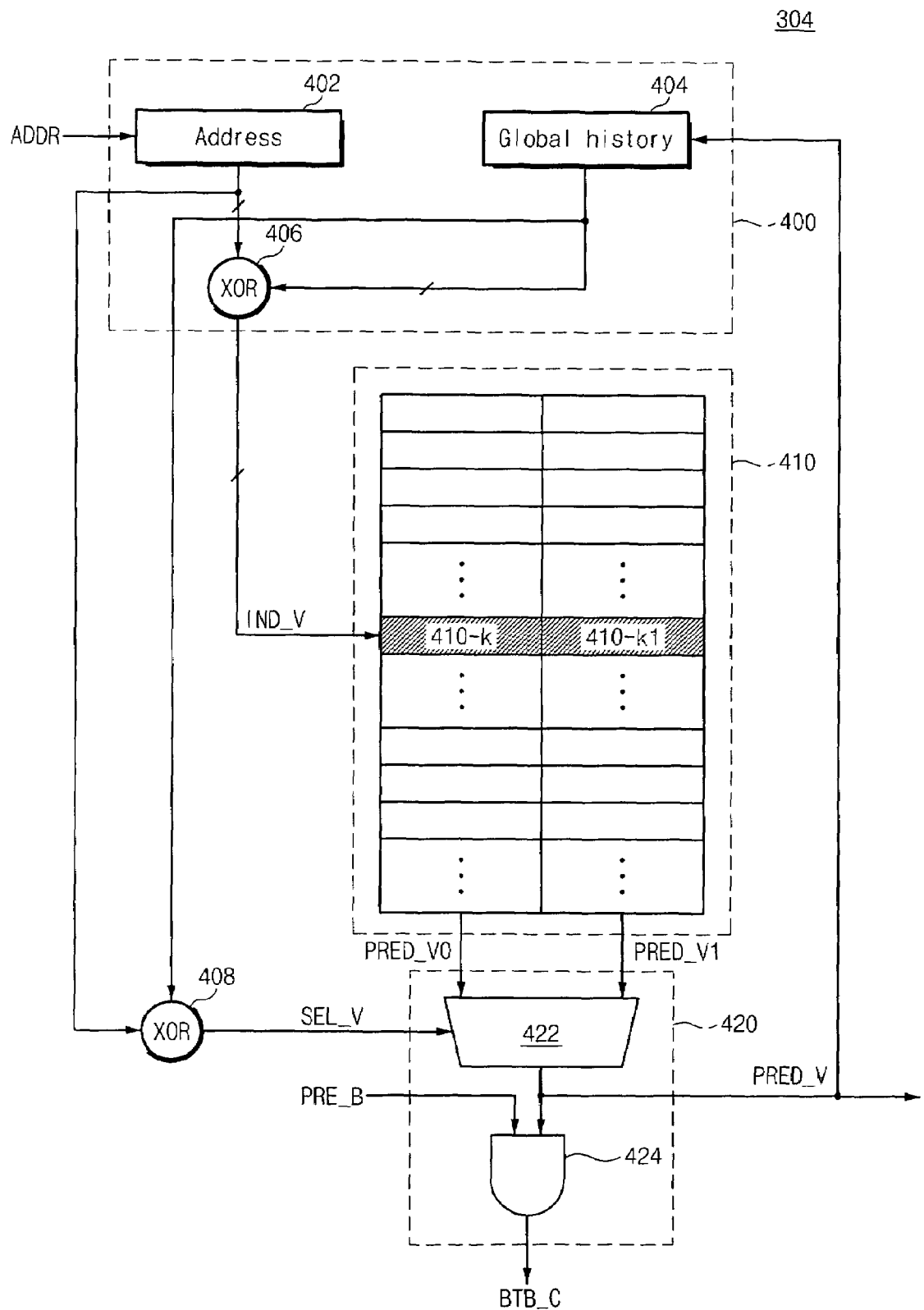
FIG. 4 illustrates the branch predictor of FIG. 3 according to an exemplary embodiment of the present invention.

FIG. 4 illustrates the branch predictor of FIG. 3 according to an exemplary embodiment of the present invention. As shown in FIG. 4, the branch predictor 304 may include an index unit 400, a branch prediction table 410 and a controller 420. The index unit 400 may index corresponding entries 410-k and 410-k1 of the branch prediction table 410 using index value IND_V. Index value IND_V may be generated by an XOR operation 406 performed on an output of a global history 404 and a current instruction address 402.

In an exemplary embodiment of the present invention, the branch prediction table 410 may include a plurality of rows. Each of the plurality of rows may include two entries so that the two entries 410-k and 410-k1 may be selected by a single index value IND_V received from the index unit 400. Accordingly, each of the plurality of rows may be indexed by a single index value IND_V.

In another exemplary embodiment of the present invention, any set of two entries associated with one of the plurality of rows may be selected for branch prediction. The least significant bits (LSBs) of the selected corresponding entries 410-k and 410-k1 may be outputted as branch prediction values PRED_V0 and PRED_V1 for the current instruction address 402.

In another exemplary embodiment of the present invention, the controller 420 may include a selector 422 and a connection controller 424. The selector 422 may select and output one of the branch prediction values PRED_V0 and PRED_V1 received from the branch prediction table 410. The selected one of the branch prediction values PRED_V0 and PRED_V1 may be output as the final branch prediction value PRED_V of the current instruction address 402.

In another exemplary embodiment of the present invention, the connection controller 424 may determine whether the processor core 302 may fetch the branch address from the branch target buffer 306 based on the final branch prediction value PRED_V.

In another exemplary embodiment of the present invention, the selector 422 may include a multiplexer. The multiplexer may select one of the branch prediction values PRED_V0 and PRED_V1 based on a selection value SEL_V determined from an output of XOR operation 408. The XOR operation 408 may receive an LSB of the current instruction address 402 and an LSB of each of the global histories 404 as its input. For example, if the selection value SEL_V is logic '0', PRED_V0 may be outputted as the final branch prediction value PRED_V. Alternatively, if the selection value SEL_V is logic '1', PRED_V1 may be outputted as the final branch prediction value PRED_V.

In another exemplary embodiment of the present invention, one of the branch prediction values PRED_V0 and PRED_V1 may be used as the final branch prediction value PRED_V for the current instruction address 402, and the other of the branch prediction values PRED_V0 and PRED_V1 may be used as the final branch prediction value PRED_V for a next instruction address.

In another exemplary embodiment of the present invention, the connection controller 424 may include a logic circuit. An exemplary example of the logic circuit of controller 424 may include an AND gate.

In another exemplary embodiment of the present invention, if the final branch prediction value PRED_V outputted from the selector 422 indicates that a branch is not taken and the previous instruction is not a branch instruction, the branch predictor 304 may indicate to the processor core 302 not to fetch the branch address from the branch target buffer 306. An example of this condition may be when PRED_V='1', PRE_B='1' and BTB_C='1'.

In another exemplary embodiment of the present invention, if the final branch prediction value PRED_V outputted from the selector 422 indicates that a branch is taken, the branch predictor 304 may indicate to the processor core 302 to fetch the branch address from the branch target buffer 306. An example of this condition may be when PRED_V='0' and BTB_C='0'.

Figure 5:
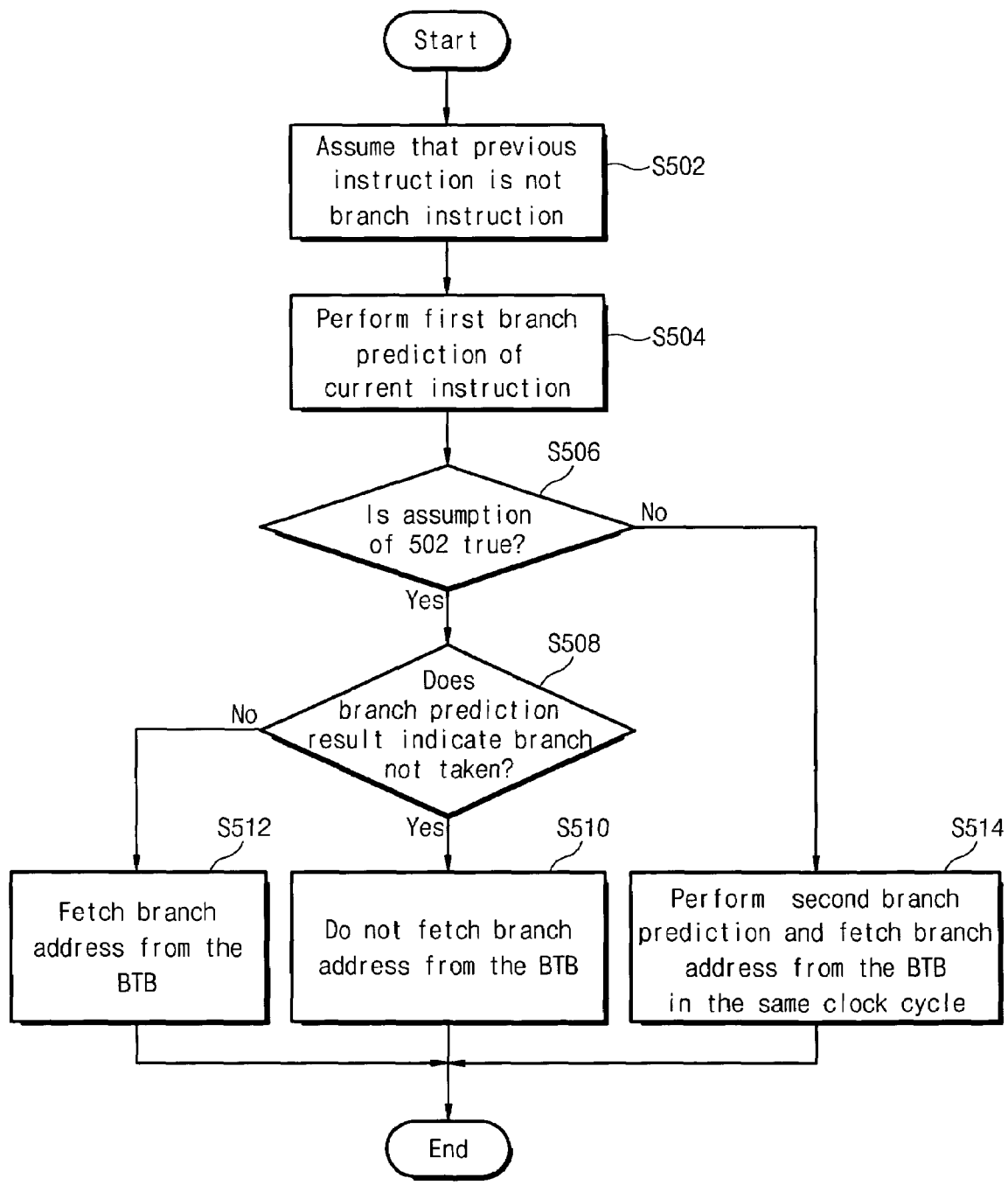
FIG. 5 illustrates a flowchart of a method of branch prediction according to an exemplary embodiment of the present invention.

FIG. 5 illustrates a flowchart of a method of branch prediction according to an exemplary embodiment of the present invention. With reference to FIGS. 4 and 5, an exemplary example of a branch prediction process of the branch predictor 304 will now be described in detail.

Prediction of a branch of the current instruction address 402 may begin one clock cycle prior to the clock cycle when a prediction of a branch of the previous instruction has executed. In this example, it may be assumed that an instruction prior to the current instruction address 402 is not a branch instruction as shown in S502. Since the global history 404 may not include information related to the previous instruction (i.e., information on whether the previous instruction may be a branch instruction or not and/or information on whether a branch prediction result PRED_V indicates whether or not to take a branch), it may be assumed that the previous instruction is not a branch instruction in S502. It may be further assumed that the global history 404 and the branch prediction table 410 may not be updated by the branch prediction of the previous instruction, but rather the values of the global history 404, and the branch prediction table 410 may be maintained at its current values.

The branch prediction table 410 may be searched using the global history 404 and the current instruction address 402 and first branch prediction of the current instruction address 402 may be performed in S504. First branch prediction may be performed similar to branch prediction in above-described exemplary embodiments of the present invention.

The execution of the previous instruction may be finished while the first branch prediction is being performed using the branch prediction table 410 and the selector 422. It may be determined whether the previous instruction is a branch instruction or not in S506. If it is determined that the previous instruction is not a branch instruction in S506, it may be determined whether the processor core 302 may fetch the branch address from the branch target buffer 306 based on the final branch prediction value PRED_V, determined in S504, in S508. Thus, if the final branch prediction value PRED_V indicates that a branch of the current instruction address 402 is not taken, the connection controller 424 of the branch predictor 304 may indicate to the processor core 302 not to fetch the branch address from the branch target buffer 306 in S510. If the final branch prediction value PRED_V indicates that a branch of the current instruction address 402 is taken, the connection controller 424 of the branch predictor 304 may indicate to the processor core 302 to fetch the branch address from the branch target buffer 306 in S512.

In S506, if it is determined that the previous instruction is a branch instruction, the global history 404 and the branch prediction table 410 may be updated based on the branch of the previous instruction. Further, with respect to the first branch prediction of the current instruction address 402, a second branch prediction may be performed using the updated values of the branch prediction table 410. Further, the processor core 302 may fetch the branch address from the branch target buffer 306 in the same clock cycle in S514.

However, if the second branch prediction is executed S514, the second branch prediction of the current instruction address 402 may overlap with the first branch prediction of a next instruction address. In this case, as described above, since the two entries of the branch prediction 410 may be selected in a single clock cycle by the single index value IND_V, if only the last bits of the next instruction address differs from the current instruction address 402, first branch prediction of the next instruction address may be performed in the same clock cycle as second branch prediction of the current instruction address 402. Thus, the global history 404 of the current instruction address 402 and the next instruction address may be identical. Thus, the two entries indexed by an address of each of the current instruction address 402 and the next instruction address may exist on a single row of the branch prediction table 410. Therefore, the two entries may be read in a single clock cycle by the single index value IND_V.

In another exemplary embodiment of the present invention, the frequency in which a processor core of a pipelined microprocessors accesses a branch target buffer may be reduced, thus reducing the power consumption of the pipelined microprocessors.

The exemplary embodiments of the present invention being thus described, it will be obvious that the same may be varied in many ways. For example, the exemplary embodiments above-described with reference to a GSHARE branch predictor may be applied to any type of branch prediction system. Further, the logic levels indicating features of the branch system have been described according to one exemplary embodiment of the present invention. However, these logic levels may be arranged according to a preference of a system designer. For example, conditions for indicating a branch is not predicted are described as PRED_V='1', PRE_B='1' and BTB_C='1'. However, any logic level for each of the indicators may be designed to indicate a branch is not predicted.

Such variations are not to be regarded as departure from the spirit and scope of the exemplary embodiments of the present invention, and all such modifications as would be obvious to one skilled in the art are intended to be included within the scope of the following claims.

What is claimed is:

1. A system of branch prediction, comprising:
  a processor core for executing instructions; a branch target buffer for fetching a branch address; and
  a branch predictor for predicting a branch of a current instruction and indicating to the processor core whether to fetch or not to fetch the branch address from the branch target buffer.

2. The system of claim 1, wherein the branch predictor predicts the branch of the current instruction based on at least one of the current instruction address and branch information of a previous instruction.

3. The system of claim 2, wherein the branch information indicates whether the previous instruction is a branch instruction.

4. The system of claim 2, wherein the branch predictor indicates to the processor core not to fetch the branch address from the branch address buffer when the previous instruction is not a branch instruction and a final branch prediction value indicates that the current instruction does not branch.

5. The system of claim 2, wherein the branch predictor indicates the processor core to fetch the branch address from the branch address buffer when the previous instruction is not a branch instruction and a final branch prediction value indicates that the current instruction does branch.

6. The system of claim 2, wherein the branch predictor predicts the branch of the current instruction and indicates to the processor core to fetch the branch address from the branch target buffer when the previous instruction is a branch instruction.

7. The system of claim 1, wherein the branch predictor outputs a final branch prediction value to the processor core.

8. The system of claim 1, wherein the branch predictor begins predicting the branch of the current instruction before a completion of predicting a branch of a previous instruction.

9. The system of claim 8, wherein the previous instruction is not a branch instruction.

10. The system of claim 1, wherein the branch predictor includes:
  a branch prediction table for storing a plurality of branch prediction values of previous branch instructions; and
  a controller for selecting one of the plurality of branch prediction values to output to the processor core.

11. The system of claim 10, wherein the controller determines the selected one of the plurality of branch prediction values based on an XOR operation.

12. The system of claim 11, wherein the XOR operation has inputs including a current instruction address and a global history.

13. The system of claim 10, wherein the branch predictor indicates whether to fetch the branch address from the branch address buffer based on the selected one of the plurality of branch prediction values.

14. The system of claim 10, wherein a first global history used to predict the branch of the current instruction is identical to a second global history used to predict a branch of the previous instruction.

15. The system of claim 10, wherein the controller includes:
  a selector for selecting one of the plurality of branch prediction values received from the branch prediction table as a final branch prediction value based on an XOR operation; and
  a connection controller for indicating to the processor core whether to fetch the branch address from the branch address buffer based on the final branch prediction value and branch information.

16. The system of claim 11, wherein the XOR operation includes inputs of the current instruction address and a least significant bit (LSB of each stored value of the global history.

17. The system of claim 15, wherein the selector includes a multiplexer.

18. The system of claim 15, wherein the connection controller includes an AND gate.

19. The system of claim 10, wherein the branch prediction table includes a plurality of rows.

20. The system of claim 19, wherein each of the plurality of rows includes two entries.

21. The system of claim 20, wherein the two entries of one of the plurality of rows are selected in a single clock cycle by a single index value.

22. The system of claim 21, wherein one of the selected two entries is used to predict a branch of the current instruction and the other one of the selected two entries is used to predict a branch of a next instruction and to indicate to the processor core whether to fetch the branch address from the branch address buffer.

23. A branch predictor, comprising:
  a branch prediction table for storing a plurality of branch prediction values of previous branch instructions; and
  a controller for selecting one of the plurality of branch prediction values and outputting the selected one of the plurality of branch prediction values to a processor core, the selected one of the plurality of branch prediction values indicating to the processor core whether to fetch or not to fetch a branch address from a branch target buffer.

24. The branch predictor of claim 23, wherein the controller determines the selected one of the plurality of branch prediction values based on an XOR operation.

25. The branch predictor of claim 24, wherein the XOR operation has inputs including a current instruction address and a global history.

26. The branch predictor of claim 23, wherein a first prediction of the branch of the current instruction begins before a second prediction of a branch of the previous instruction has executed.

27. The branch predictor of claim 26, wherein the previous instruction is not a branch instruction.

28. The branch predictor of claim 23, wherein a first global history used to first predict the branch of the current instruction is identical to a second global history used to second predict the branch of the previous instruction.

29. The branch predictor of claim 23, wherein the branch predictor indicates the processor core not to fetch the branch address from the branch address buffer when the previous instruction is not a branch instruction and the final branch prediction value indicates that the current instruction does not branch.

30. The branch predictor of claim 23, wherein the branch predictor indicates the processor core to fetch the branch address from the branch address buffer when the previous instruction is not a branch instruction and the final branch prediction value indicates that the current instruction does branch.

31. The branch predictor of claim 23, wherein the branch predictor predicts the branch of the current instruction address and indicates to the processor core to fetch the branch address from the branch target buffer when the previous instruction is a branch instruction.

32. The branch predictor of claim 23, wherein the controller includes:
  a selector for selecting one of the plurality of branch prediction values received from the branch prediction table as the final branch prediction value based on an XOR operation; and
  a connection controller for indicating to the processor core whether to fetch or not to fetch the branch address from the branch address buffer based on the final branch prediction value and branch information.

33. The selector of claim 32, wherein the XOR operation has inputs of the current instruction address and a least significant bit (LSB of each stored value of the global history.

34. The branch predictor of claim 32, wherein the selector includes a multiplexer.

35. The branch predictor of claim 32, wherein the connection controller includes an AND gate.

36. The branch predictor of claim 23, wherein the branch prediction table includes a plurality of rows.

37. The branch predictor of claim 36, wherein each of the plurality of rows includes two entries.

38. The branch predictor of claim 37, wherein the two entries of one of the plurality of rows are selected in a single clock cycle by a single index value.

39. The branch predictor of claim 37, wherein one of the selected two entries is used to predict a branch of the current instruction and the other one of the selected two entries is used to predict a branch of a next instruction and to indicate to the processor core whether to fetch the branch address from the branch address buffer.

40. A method of branch prediction, comprising:
  receiving a current instruction address;
  predicting a branch of the current instruction based on the received current instruction address and a global history; and
  outputting a final branch prediction value, the final branch prediction value indicating whether to fetch or not to fetch a branch address from a branch target buffer.

41. The method of claim 40, wherein a previous instruction does not branch.

42. The method of claim 40, wherein the final branch prediction value indicates to fetch the branch address when the previous instruction does not branch and the final branch prediction value indicates that the current instruction does branch.

43. The method of claim 40, wherein the final branch prediction value indicates the processor core to not fetch the branch address when the previous instruction does not branch and the final branch prediction value indicates that the current instruction does not branch.

44. The method of claim 40, wherein the final branch prediction value indicates to fetch the branch address when the previous instruction is a branch instruction.

* * * * *